United States Patent
Brodie et al.

(10) Patent No.: US 10,022,610 B2
(45) Date of Patent: Jul. 17, 2018

(54) POLE MOUNTED SAFETY RESTRAINT FOR USE IN MOBILE FITNESS VEHICLE

(71) Applicants: Eric L. Brodie, West Newton, MA (US); Seema M. Brodie, West Newton, MA (US)

(72) Inventors: Eric L. Brodie, West Newton, MA (US); Seema M. Brodie, West Newton, MA (US)

(73) Assignee: BikeBus, LLC, West Newton, MA (US)

( * ) Notice: Subject to any disclaimer, the term of this patent is extended or adjusted under 35 U.S.C. 154(b) by 0 days.

(21) Appl. No.: 15/088,084

(22) Filed: Mar. 31, 2016

(65) Prior Publication Data

US 2016/0288765 A1    Oct. 6, 2016

Related U.S. Application Data

(60) Provisional application No. 62/140,467, filed on Mar. 31, 2015.

(51) Int. Cl.
| | |
|---|---|
| *B60R 22/22* | (2006.01) |
| *B60R 22/24* | (2006.01) |
| *A63B 71/00* | (2006.01) |
| *A62B 35/00* | (2006.01) |
| *B60R 21/00* | (2006.01) |
| *B60R 22/34* | (2006.01) |
| *A63B 69/00* | (2006.01) |
| *A63B 71/02* | (2006.01) |
| *A63B 22/06* | (2006.01) |

(52) U.S. Cl.
CPC ...... *A63B 71/0054* (2013.01); *A62B 35/0056* (2013.01); *A62B 35/0068* (2013.01); *B60R 22/22* (2013.01); *B60R 22/24* (2013.01); *A63B 22/0605* (2013.01); *A63B 69/0057* (2013.01); *A63B 71/023* (2013.01); *A63B 2071/0072* (2013.01); *B60R 22/34* (2013.01); *B60R 2021/0037* (2013.01)

(58) Field of Classification Search
CPC . A62B 35/0068; A62B 35/0056; B60R 22/22; B60R 22/24; B60R 2021/0037
USPC .................. 280/801.1, 801.2, 807
See application file for complete search history.

(56) References Cited

U.S. PATENT DOCUMENTS

| | | | | |
|---|---|---|---|---|
| 4,607,724 A | * | 8/1986 | Hillberg | A62B 35/04 182/3 |
| 9,010,487 B2 | * | 4/2015 | Cruz | E04G 21/3276 182/3 |
| 9,410,332 B2 | * | 8/2016 | Patton | A62B 35/0068 |
| 2006/0289233 A1 | * | 12/2006 | Flaherty | E04G 21/3261 182/45 |
| 2010/0126801 A1 | * | 5/2010 | Begin | A62B 35/0056 182/3 |

* cited by examiner

*Primary Examiner* — Keith J Frisby

(57) ABSTRACT

A pole-mounted individual safety restraint system that incorporates a self-retracting lanyard, suitable for installation and use in vehicles so as to allow exercise or other activity on the vehicle while the vehicle is in motion.

4 Claims, 8 Drawing Sheets

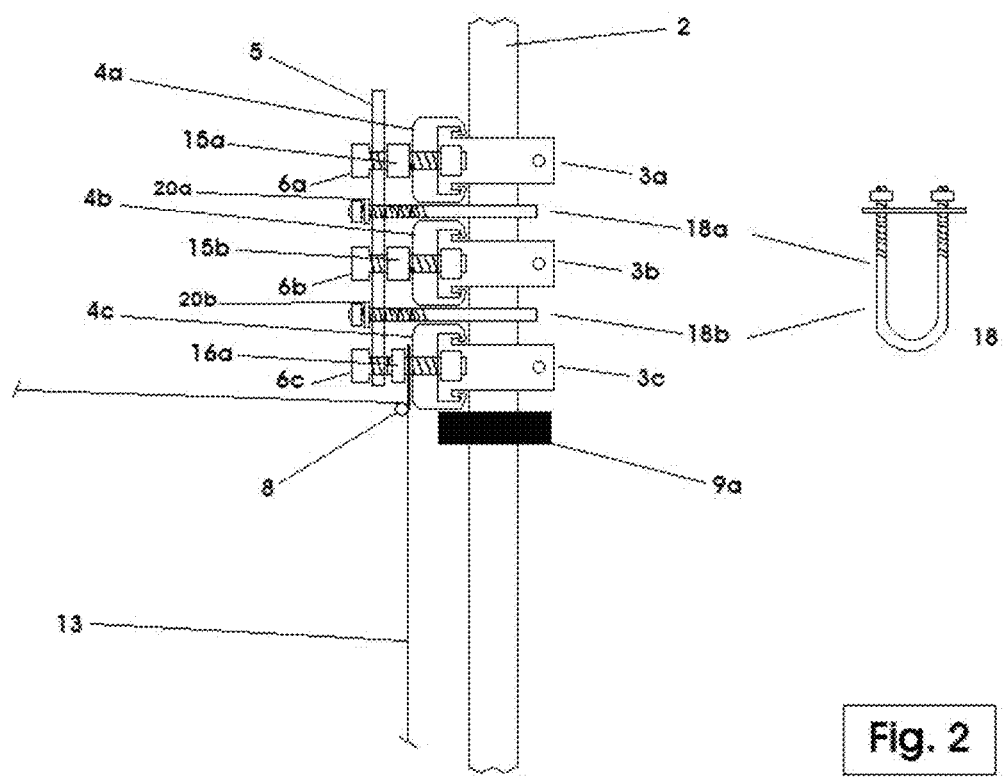
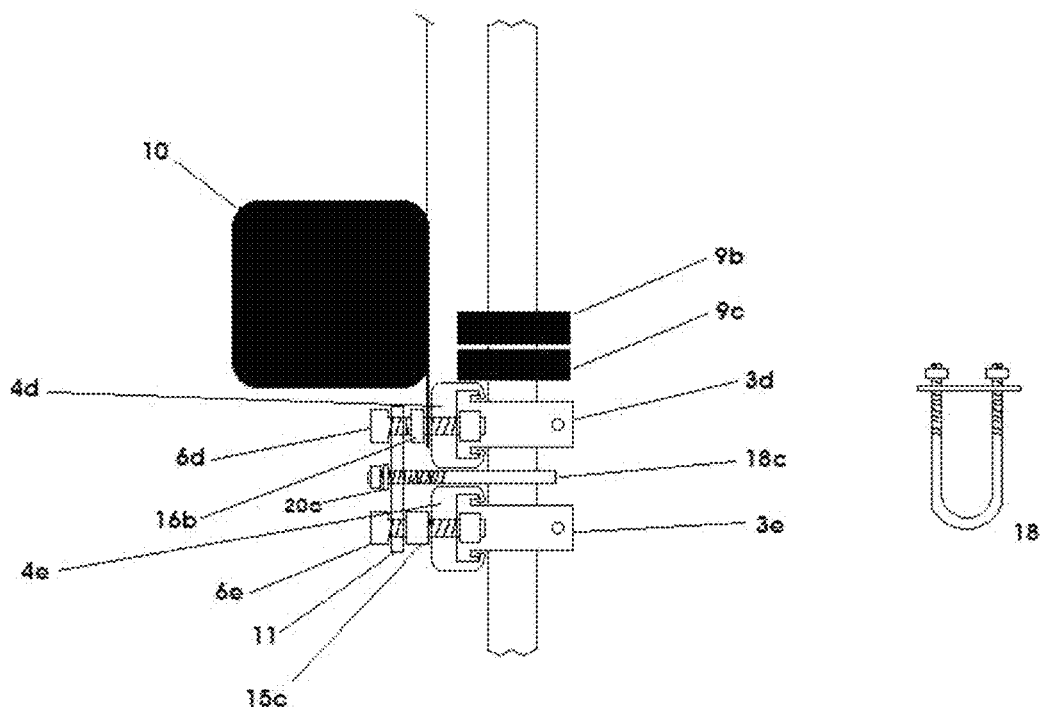
Fig. 2

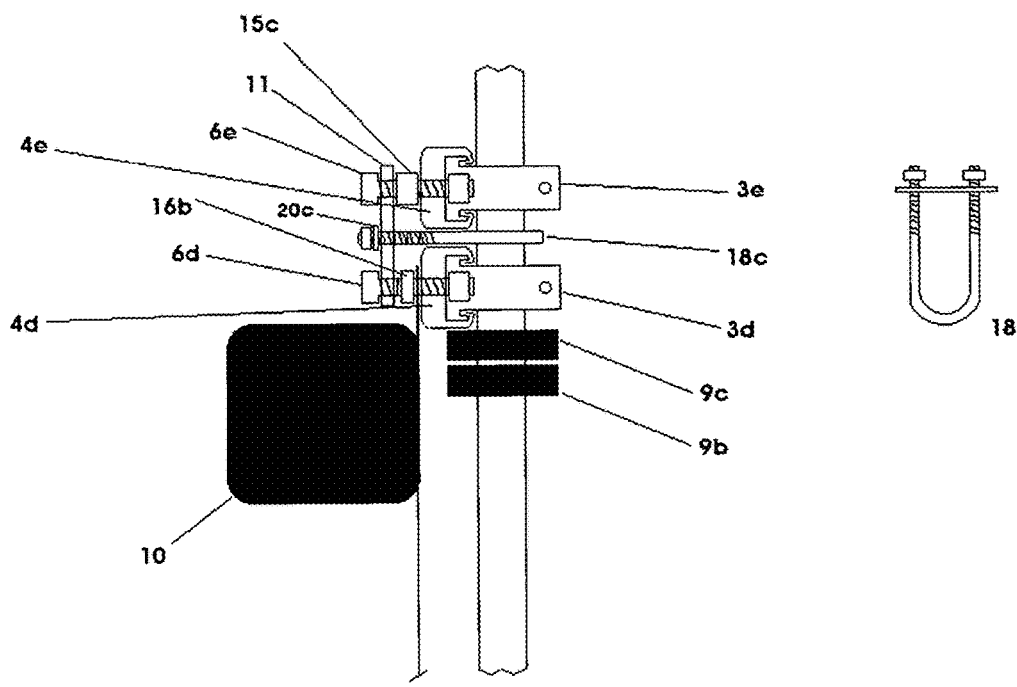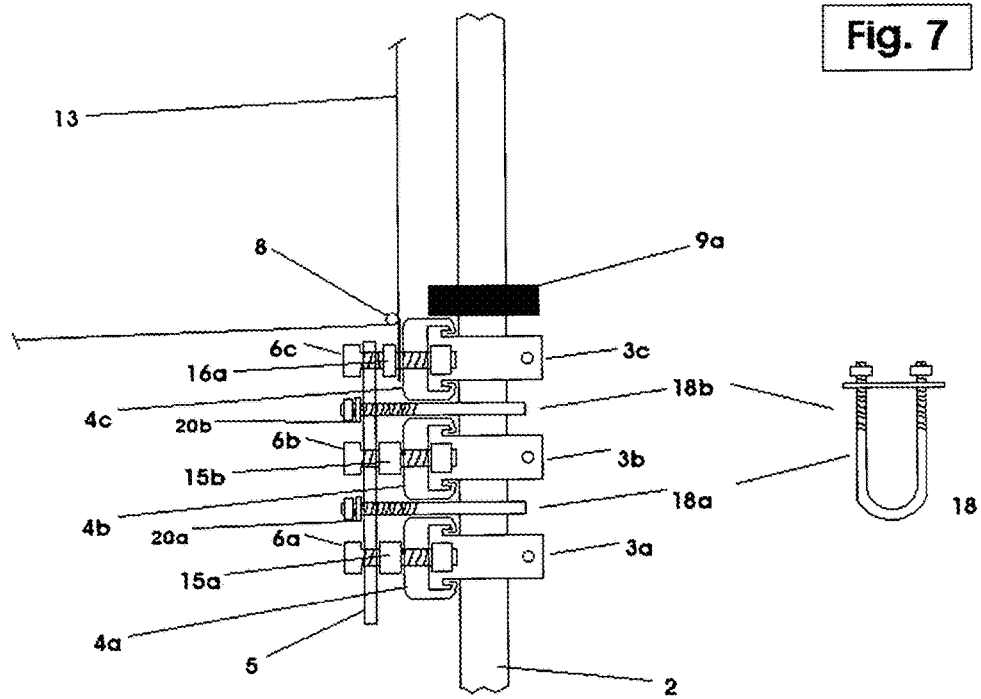
Fig. 7

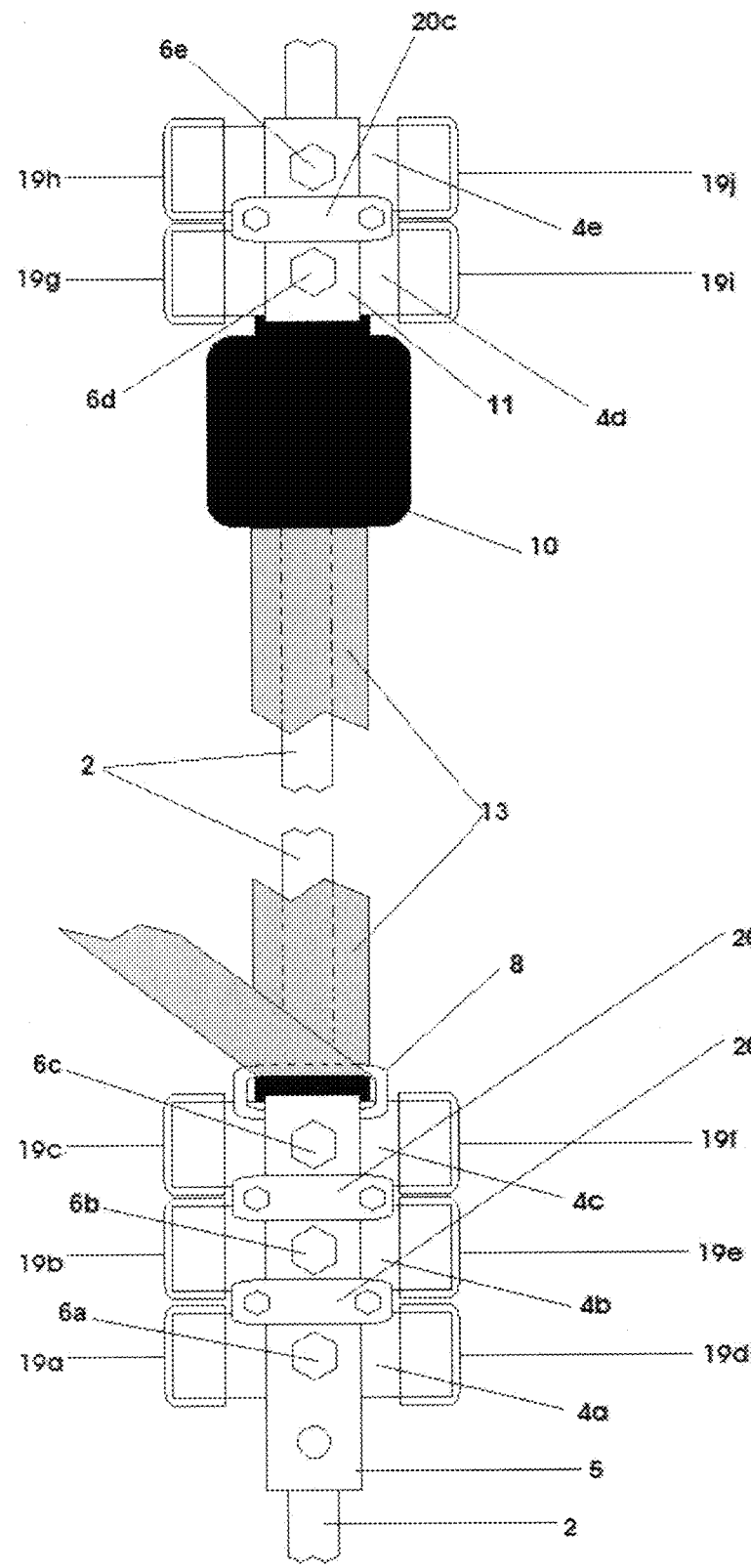

though this awareness, many of those same people forego regular exercise due to time pressures of other obligations that take priority. Finding the time to exercise becomes extremely difficult, especially for those persons who, in addition to daily activities, must also engage in commutes to and from work that consume additional time.

POLE MOUNTED SAFETY RESTRAINT FOR USE IN MOBILE FITNESS VEHICLE

CROSS-REFERENCE TO RELATED APPLICATION

The present application claims priority under 35 USC § 119(e) to U.S. Provisional Application No. 62/140,467, filed Mar. 31, 2015, the disclosure of which is incorporated herein by reference in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention is the result of a convergence of several fields, notably physical fitness and transportation, and in particular, the needs relating to safety that arise out of that convergence.

Most people recognize the importance of regular exercise as part of a healthy lifestyle. But despite this awareness, many of those same people forego regular exercise due to time pressures of other obligations that take priority. Finding the time to exercise becomes extremely difficult, especially for those persons who, in addition to daily activities, must also engage in commutes to and from work that consume additional time.

Several persons have described the general notion of finding the time to exercise during one's morning or afternoon commute, with some suggesting limited activities that can be performed by drivers. However, to date, it does not appear there are any commercially attempted answers to the workout-while-you-commute question. It is believed that this is due, in large part, to the significant safety issues that arise when one considers that exercising is typically done on the ground, rather than in a vehicle that is in motion. The present invention addresses those safety issues and thus, permits aerobic exercise on a moving platform.

Related patents include U.S. Pat. No. 5,667,267, issued to Talucci on Feb. 15, 1996, which discloses an expandable trailer that can be used for fitness equipment, albeit only when the trailer is stationary and has been deployed. The prior art also includes numerous examples of commercially available mobile gyms, e.g. http://www.mobilefitness.net/home.html, http://www.mikesmobilegym.com, http://informfitness.com/locations/mobile-gym, but these are exclusively of the kind that are stationary when the actual exercise activity is underway. Of note is the San Francisco Bay, California-based Outburst Fitness, http://www.outburstfitness.com, which has a mobile indoor cycling studio in a trailer that it offers to bring to a location of the consumer's choice. Again, however, this studio is stationary when people are exercising.

Internationally, there are examples of at least one mobile gym that was in existence in the mid-2000s, known as "BusBike" based in Rio de Janeiro, Brazil. Although at the time of this filing this business is not operating, evidence of this endeavor can still be found on the Internet in various locations, including at http://vvmbt.blogspot.com/2006/10/bike-nibus-rio-de-janeiro.html, and a YouTube video found at https://www.youtube.com/watch?v=kZmPd_ZsaSl. Significantly, it appears that all of the exercise equipment in the buses shown is free-standing, and there are no restraints in use by the riders, a significant omission in this particular example of prior art.

Also related are patents in the art of self-retracting lanyards, such as U.S. Pat. No. 8,528,694, issued to Meilett, et al. on Sep. 10, 2013, which describes a retractable horizontal lifeline assembly; and U.S. Pat. No. 6,964,391, issued to Anderson on Nov. 15, 2005, which adapts the use of commercially available self-retracting lanyards into a disclosed method of anchoring. Self-retracting lanyard assemblies, also known as inertia reels, are favored because they combine freedom of controlled movement while affording protection against uncontrolled, accelerated motion in the event of a fall or sudden stop. The use of inertia reels in motor vehicles is now widespread in the form of what is commonly referred to as a "three-point seat belt." See U.S. Pat. No. 3,236,540, issued to Berton, et al. on Feb. 22, 1966.

A final area of related patents are in the art of body or occupant restraint or confinement using vest-type restraints, such as those disclosed in U.S. Pat. No. 6,896,291, issued to Peterson on May 24, 2005, which discloses a chest harness anchored to the vehicle's interior ceiling using via a rotatable anchor and an inertia reel built into the harness itself; U.S. Pat. No. 8,550,036, issued to Morris, et al. on Oct. 8, 2013, which discloses a harness for use by animals that adapts the three-point seat belt to restrain animal passengers; and U.S. Pat. No. 8,777,323, issued to Merrill, et al. on Jul. 15, 2014, which discloses a harness for use by gunners in military vehicles that can be attached to the vehicle to prevent unwanted movement.

The foregoing patent and prior art information reflects the general state of the art of which the inventor is aware, although it is not exhaustive. It is respectfully suggested, however, that the foregoing patent and other information regarding the state of the fitness industry do not teach or render obvious, singly or when considered in combination, the presently claimed invention, in part as indicated by the demonstrated lack of any similarly commercially adopted solutions.

The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the concept upon which this disclosure is based may readily be utilized as a basis for the designing of other structures, methods and systems for carrying out the several purposes of the present invention. It is important, therefore, that this disclosure be regarded as including such equivalent constructions insofar as they do not depart from the spirit and scope of the invention described herein.

Further objects and advantages of the technology described herein will be apparent from the following detailed description of a presently preferred embodiment that is illustrated schematically in the accompanying drawings identified as FIGS. 1, 2, 3, 4, 5, 6, 7 and 8.

SUMMARY OF THE INVENTION

The technology described here provides a system for restraining persons on a moving vehicle while simultaneously allowing a limited degree of movement conducive to exercise activity. Assuming that the exercise equipment itself is anchored securely to the moving vehicle, an anchor point for the restraint system is installed by providing a vertical support of sufficient strength so as to allow a self-retracting lanyard (also known as an inertia reel) attached to that vertical support to activate in the event of a crash, panic stop, or other hard braking event. The vertical support must be securely anchored to the framing and flooring of the vehicle so as to withstand anticipated panic stop forces. Finally, the exercise participant must wear a harness that connects the participant, via the lanyard, to the vertical support. During normal exercising (whether or not the vehicle is in motion) the self-retracting lanyard allows freedom of movement, permitting the participant to participate in certain exercise movements.

In the event of a panic stop while the participant is on a moving vehicle, the retracting lanyard's inertia-activated brake is triggered, thereby preventing an uncontrolled movement through the interior of the vehicle. This mitigates risks otherwise borne by participants who might otherwise be thrown uncontrollably forward through the vehicle as it decelerates quickly. An important aspect of the operation of the lanyard is that it should form a vector that is close to the angle of predicted force of the wearer of the harness. It is also important that the connection point of the harness be near the center of gravity of the harness wearer, after taking into account the wearer's activity immediately prior to the panic stop or other sudden deceleration.

In one exemplary embodiment, the technology described herein is installed in a bus equipped with indoor cycling equipment. The indoor cycling equipment itself is anchored to the floor (typically a surface flooring with a plywood subfloor) by way of metal anchors of sufficient strength to withstand forces anticipated if the bus undergoes a panic stop. Immediately behind the individual cycles, the present invention provides for the installation of a vertical pole of sufficient strength to withstand anticipated horizontal forces associated with a panic stop. By way of example, but not limitation, stainless steel pipe of a thickness sufficient to withstand anticipated horizontal forces is used for the vertical support. Further by way of example, but not limitation, flanges made from either stainless steel, aluminum, or another suitable alloy is used to securely anchor the vertical pole to the floor and roof framing of the bus. Further by way of example and not limitation, mounted to the vertical pipe via the use of strut channel hardware sufficient to withstand anticipated deceleration forces is a retractor assembly with webbing and hardware that complies with applicable United States Federal Motor Vehicle Safety Standards. The integrity of the system is reinforced by the use of shaft collars on the vertical pipe to prevent axial slippage of the restraint hardware along the length of the vertical pipe.

BRIEF DESCRIPTION OF THE DRAWINGS

FIG. 2 is a close-up, detailed end profile view of the upper and lower pole-mounted assemblies shown in FIG. 1;

FIG. 7 is a close-up, detailed end profile view of the upper and lower pole-mounted assemblies shown in FIG. 6;

FIG. 8 is a close-up, detailed front view of the upper and lower pole-mounted assemblies shown in FIG. 6.

DETAILED DESCRIPTION OF THE INVENTION AND PREFERRED EMBODIMENT

Referring now to the invention in more detail, FIGS. 1, 2, 3, 4,5, 6, 7 and 8 each depict a pole-mounted restraint. The exercise equipment would be to the left of the images depicted in FIGS. 1 and 6, with the webbing 13 being linked to the back of a harness using a carabiner 14.

The construction details of the invention as shown in FIGS. 1, 2, 3, 4, 5, 6, 7 and 8 are that the hardware is primarily constructed of steel or other sufficiently rigid and strong metal or high strength plastic, with the exception of the plastic housing and parts of the retractor 10 and the synthetic fiber seat belt webbing 13.

Figure 1:
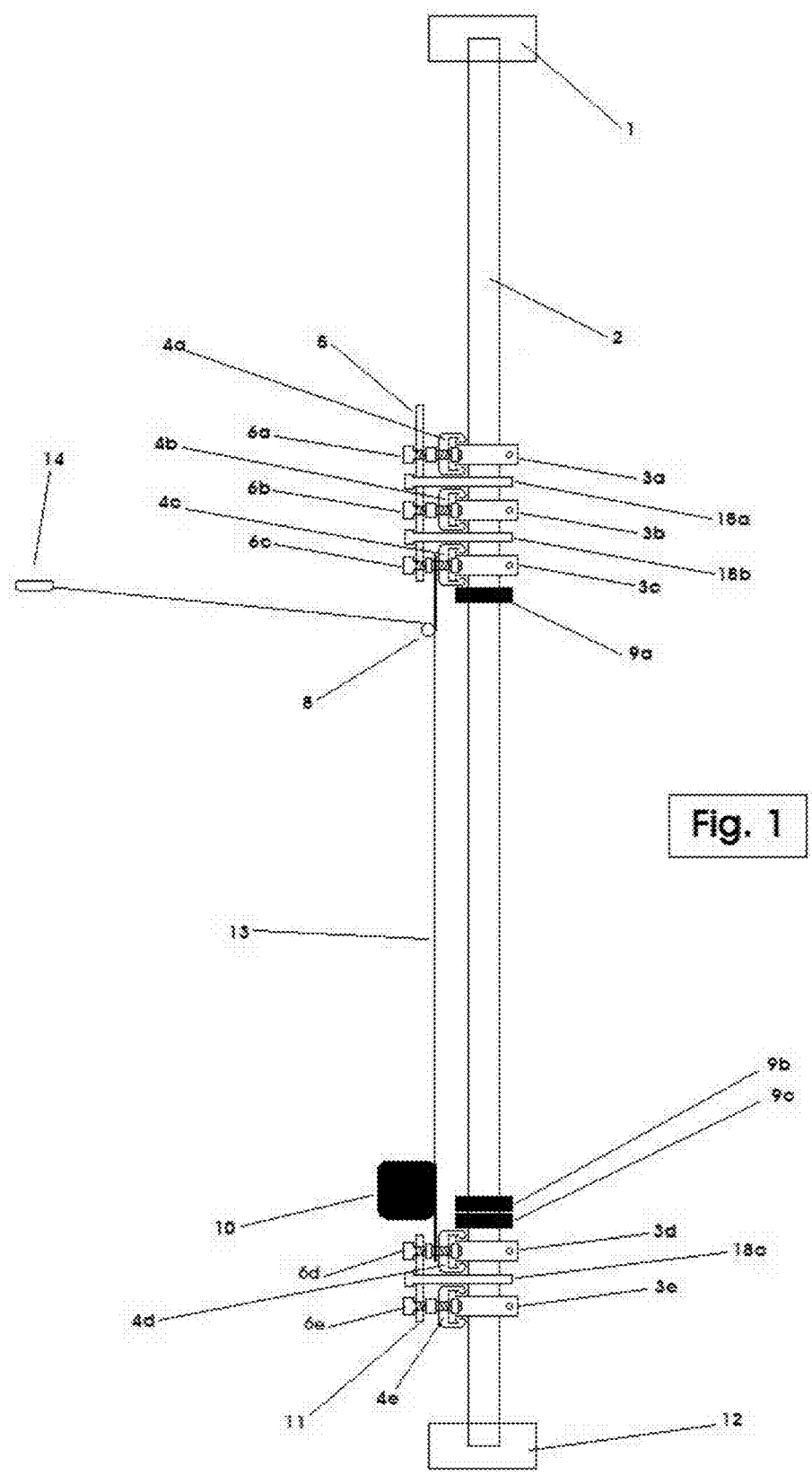
FIG. 1 is an end profile view of a pole-mounted restraint of the present invention.

The system is based upon the use of a pole 2, which is attached to the vehicle's floor and ceiling via anchors 1, 12 that are of sufficient strength to withstand anticipated braking forces. By way of example, a stainless steel Schedule 40 pole would provide suitable strength but poles of other dimensions, thicknesses, and strengths may be used as needed. A seat belt retractor 10 is then attached to the pole 2 by way of pole-mounted strut channels, the first, as shown in FIG. 1, being located close to the floor end of the pole 4d, 4e, and the others either level with or above the back of the passenger's harness 4a, 4b, 4c (hereafter, the "harness level" of the pole). In FIG. 1, these channels are held in place at the floor end of the pole by pipe clamps 3d, 3e and at the harness level of the pole by pipe clamps 3a, 3b, 3c. To increase design strength and redundancy, the pipe clamps 3a, 3b, 3c, 3d, 3e are doubled.

In FIG. 1, the channels are bolted together using either a two-holed steel plate 11 found at the floor end of the pole, or a four-holed steel plate 5 found at the harness level of the pole. The holes in either steel plate 5 or 11 must be sufficiently large to admit ½ inch bolts 6a, 6b, 6c, 6d, 6e.

Figure 3:
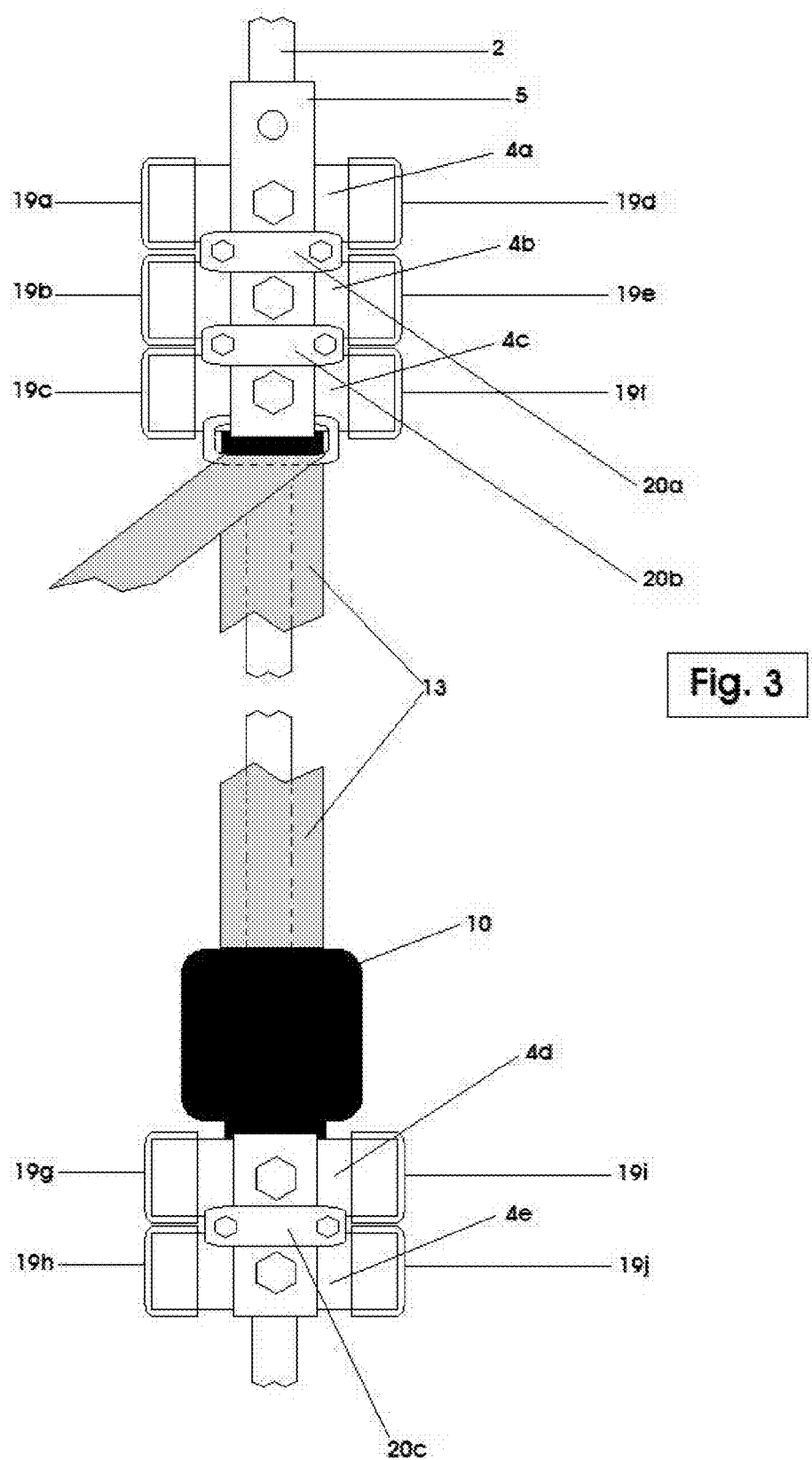
FIG. 3 is a close-up, detailed front view of the upper and lower pole-mounted assemblies shown in FIG. 1.
Figure 4:
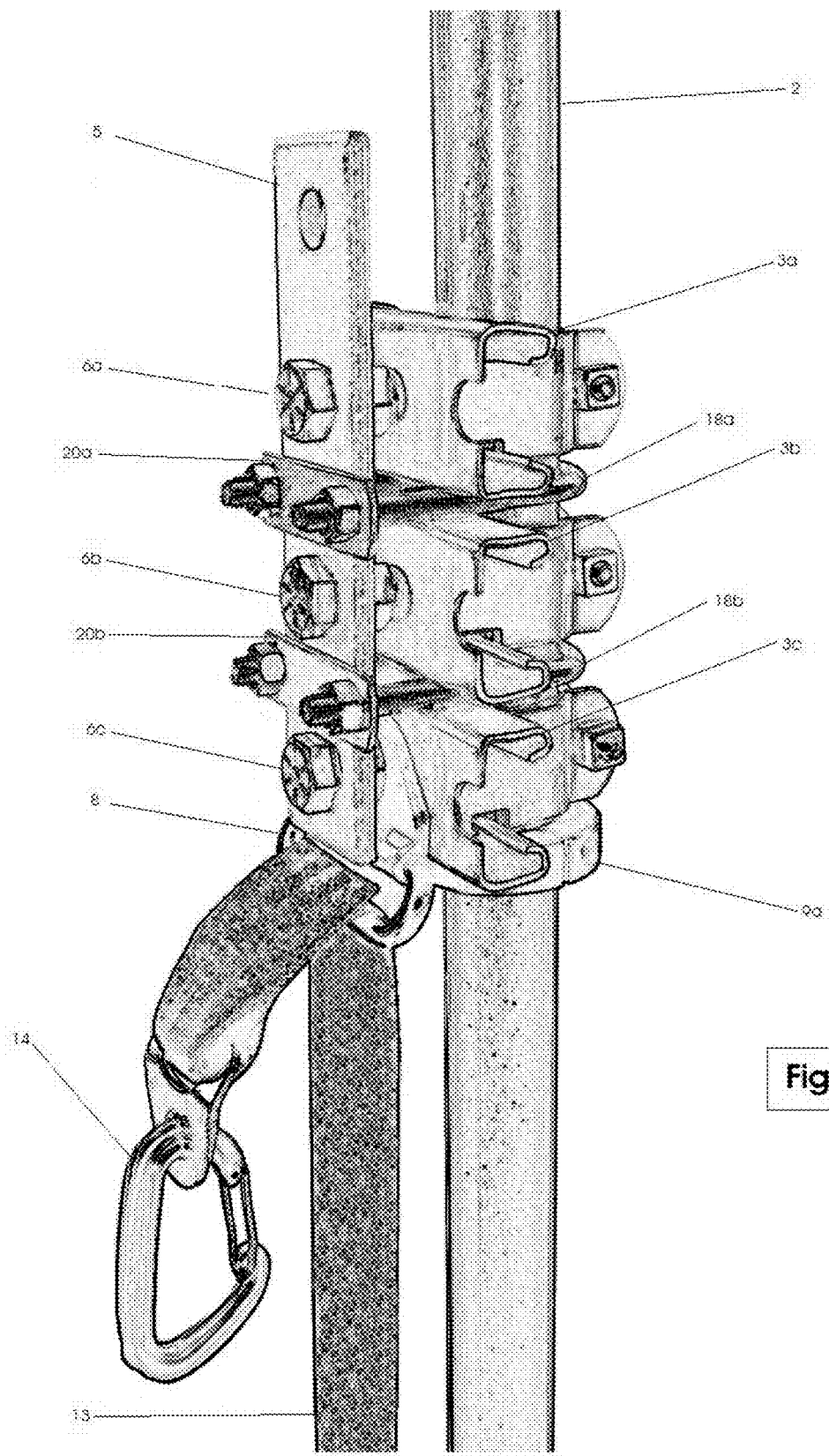
FIG. 4 is a perspective view of the upper pole-mounted assembly shown in FIGS. 1, 2 and 3.
Figure 5:
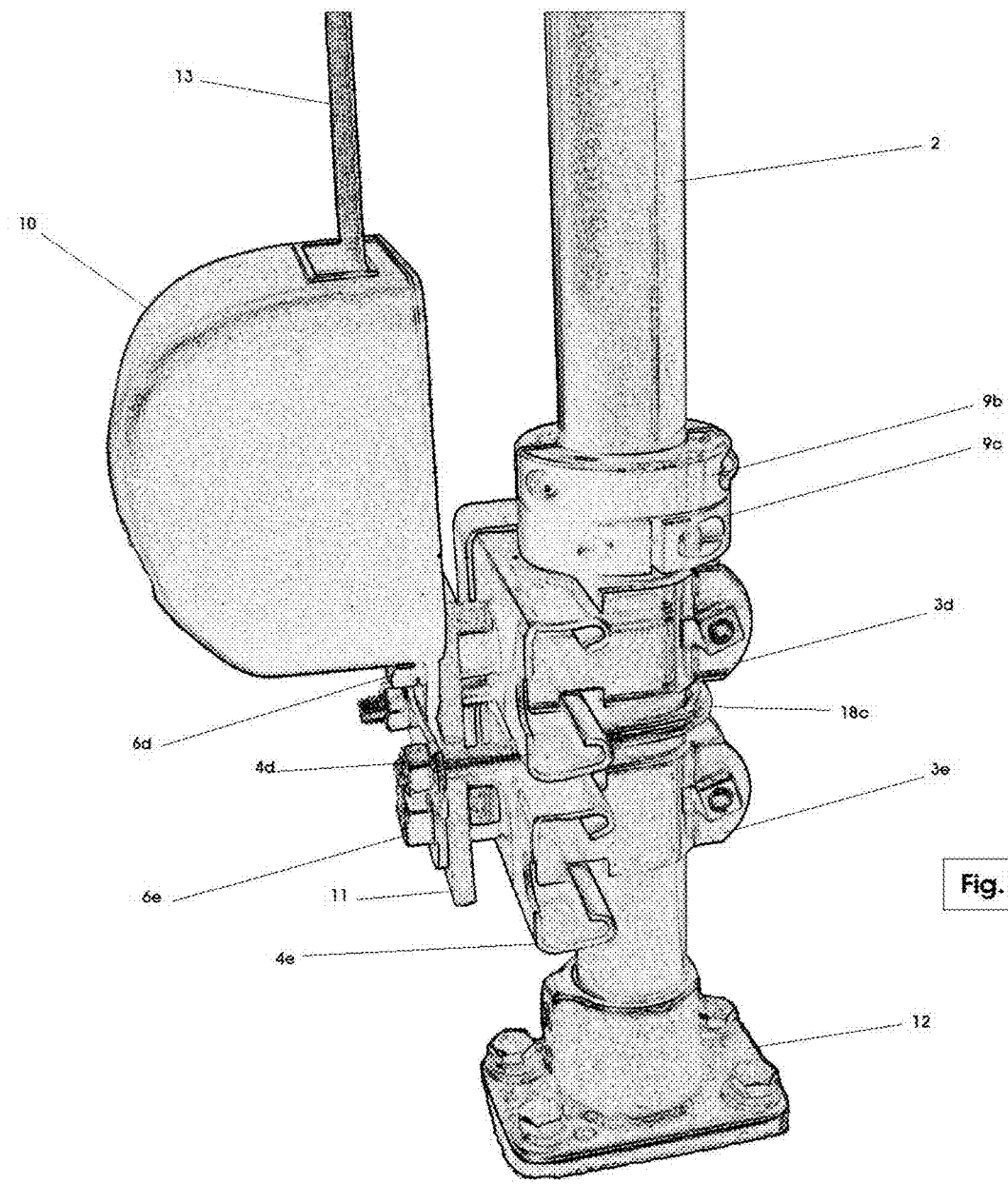
FIG. 5 is a perspective view of the lower pole-mounted assembly shown in FIGS. 1, 2 and 3.

In FIG. 1, toward the floor end of the pole, the assembly consists of the two-holed steel plate 11, which is bolted to two strut channels 4d and 4e, with a standard nut 15c between the plate 11 and the face of the strut channel 4e, and a jam nut 16b and the anchor plate of the retractor 10 in between the plate 11 and the face of the strut channel 4d. Once the two strut channels 4d and 4e and the retractor 10 are connected by the steel plate 11, the entire assembly can be affixed as one unit to the pole by pipe straps 3d and 3e, which are doubled up to increase design strength. The retractor 10 must be mounted so that the webbing 13 plays out freely toward the harness level of the pole, running parallel with the pole 2. Finally, to further increase strength and offer further rigidity, a u-bolt 18c is installed that encircles the entire assembly, passing in between strut channels 4d and 4e, held in place by a plate 20c passing over steel plate 11, as shown in FIG. 3. In addition, to prevent axial slippage, two split-shaft collars 9b and 9c are installed above strut channel 4d at the appropriate torque.

At the harness level, the assembly shown in FIGS. 1, 2 and 3 consists of the four-holed steel plate 5, which is bolted to three strut channels 4a, 4b and 4c, with standard nuts 15a and 15b between the plate 5 and the face of the strut channels 4a and 4b, and a jam nut 16a and the anchor plate of the belt router 8 in between the plate 5 and the face of the strut 4c. Once the three strut channels 4a, 4b and 4c and the belt router 8 are connected by the steel plate 5, the entire assembly can be affixed as one unit to the pole 2 by pipe straps 3a, 3b and 3c, which are doubled up to increase design strength. Finally, to further increase strength and offer further rigidity, two u-bolts 18a, 18b are installed that encircle the entire assembly, with u-bolt 18a passing below strut channel 4a and above strut channel 4b, held in place by a plate 20a passing over steel plate 5, and with u-bolt 18b passing below strut channel 4b and above strut channel 4c, held in place by a plate 20b passing over steel plate 5. In addition, to prevent axial slippage, one split-shaft collar 9a is installed below strut 4c at the appropriate torque.

The unused hole at the top of plate 5 (see FIGS. 3 and 4) can be used as a clip-in storage point for the carabiner 14 and webbing 13.

To protect against sharp edges, safety caps as depicted in FIG. 3 are installed over the edges of the struts, 19a, 19b, 19c, 19d, 19e, 19f, 19g, 19h, 19i, 19j.

An advantage of this over other designs is that the individual parts may be disassembled as needed for inspection, and over time, replacement.

A further advantage of this over other designs is that the pole may be mounted virtually anywhere within the vehicle structure, so long as the flanges 1 and 12 are solidly anchored to the deck and ceiling of the vehicle.

A further advantage of this over other designs is that there are redundant points of force bearing, so that the failure of one component is unlikely to result in the failure of the entire system.

Another advantage of this over other designs is the flexibility of the location of the retractor 10, which could be located toward the upper end of the pole instead of the lower end if the particular application so required it. An example of an alternative location of the retractor is depicted in FIGS. 6, 7, and 8, in which the retractor 10 is attached to the pole 2 near the ceiling anchor 1.

Figure 6:
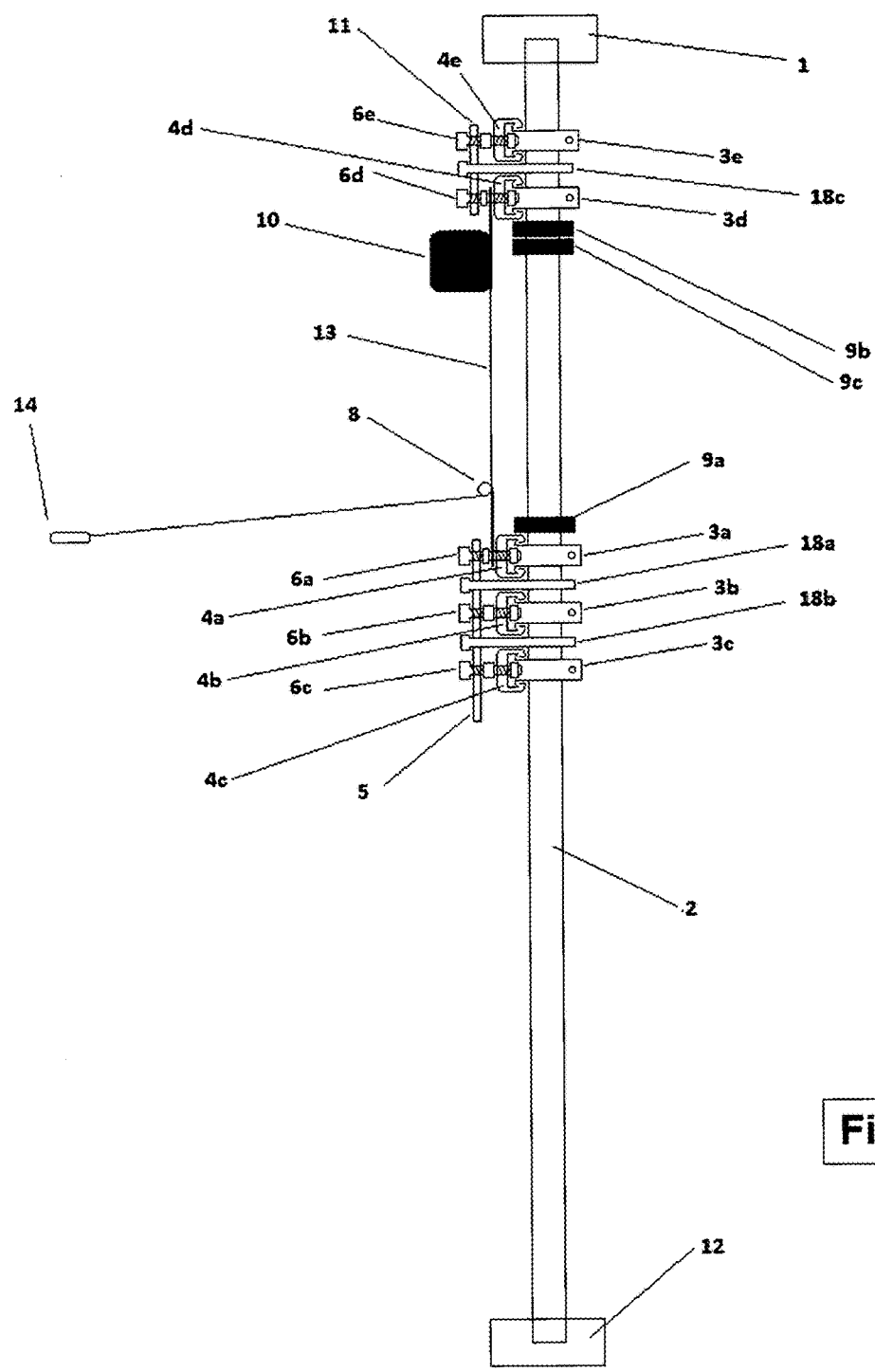
FIG. 6 is an end profile view of an alternative version of a pole-mounted restraint of the present invention.

The ceiling strut channel assembly as shown in FIGS. 6 and 7 is essentially the floor assembly as shown in FIGS. 1 and 2, except that the retractor 10 is inverted and mounted toward the top of the pole 2, closer to the ceiling. Since the hardware used is in the assembly shown in FIG. 6 is the same as that used in FIG. 1, the numbering of the hardware shown FIGS. 1, 2, and 3 is used again in FIGS. 6, 7 and 8 for consistency.

In the alternative configuration shown in FIG. 6, the retractor 10 is located toward the ceiling end of the pole 2, and is attached to a two-holed steel plate 11, which is in turn bolted to two channels 4d and 4e, with a standard nut 15c between the plate 11 and the face of the channel 4e, and a jam nut 16b and the anchor plate of the retractor 10 in between the plate 11 and the face of the channel 4d. Once the two channels 4d and 4e and the retractor 10 are connected by the steel plate 11, the entire assembly can be affixed as one unit to the pole by pipe straps 3d and 3e, which are doubled up to increase design strength. The retractor 10 must be mounted so that the webbing 13 plays out freely toward the harness level of the pole, running parallel with the pole 2. To further increase strength and offer more rigidity, a u-bolt 18c is installed that encircles the entire assembly, passing in between channels 4d and 4e, held in place by a plate 20c passing over steel plate 11, as shown in FIG. 7. In addition, to prevent axial slippage, two split-shaft collars 9b and 9c are installed under channel 4d at the appropriate torque.

In the alternative configuration shown at FIG. 6, at the harness level, the assembly consists of the four-holed steel plate 5, which is bolted to three channels 4a, 4b and 4c, with standard nuts 15a and 15b between the plate 5 and the face of the channels 4a and 4b, and a jam nut 16a and the anchor plate of the belt router 8 in between the plate 5 and the face of the strut 4c. Once the three channels 4a, 4b and 4c and the belt router 8 are connected by the steel plate 5, the entire assembly can be affixed as one unit to the pole 2 by pipe straps 3a, 3b and 3c, which are doubled up to increase design strength. Finally, to further increase strength and offer further rigidity, two u-bolts 18a, 18b are installed that encircle the entire assembly, with u-bolt 18a passing below channel 4a and above channel 4b, held in place by a plate 20a passing over steel plate 5, and with u-bolt 18b passing below channel 4b and above channel 4c, held in place by a plate 20b passing over steel plate 5. In addition, to prevent axial slippage, one split-shaft collar 9a is installed above strut 4c at the appropriate torque.

The unused hole at the bottom of plate 5 (see FIG. 8) can be used as a clip-in storage point for the carabiner 14 and webbing 13.

To protect against sharp edges, safety caps as depicted in FIG. 8 are installed over the edges of the struts, 19a, 19b, 19c, 19d, 19e, 19f, 19g, 19h, 19i, 19j.

All bolts and nuts must be torqued so as to provide adequate system rigidity. Nuts and bolts should be minimum Grade 5 to ensure sufficient strength of the overall assembly.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

We claim:

1. A personal restraint system for use in moving vehicles for securing occupants while at the same time allowing limited movement of the occupant, comprising:
   a pole affixed to the deck and ceiling of the vehicle interior;
   a base assembly, attached to the lower half of the pole;
   an upper assembly, attached at or near the midpoint of the pole;
   a retractor attached to said base assembly, with webbing deployed parallel to said pole and fed through a webbing guide or router attached to said upper assembly;
   said webbing having an end fitting that permits the clipping of a carabiner or other removable attachment mechanism to permit the webbing to be attached to the rear of a harness;
   said pole being affixed to the vehicle using flanges made of steel, aluminum, or other material of sufficient strength;
   said base assembly being constructed by using at least two strut channels attached to said pole, said strut channels being attached to said pole using a minimum of one set of pipe clamps per strut channel of size appropriate to match the diameter of said pole, said strut channels being connected to each other at their face using a two-holed metal bracket with holes large enough to admit bolts of minimum grade 5 strength, the topmost bolt which shall be used to affix said retractor in a vertical upward position;
   said base assembly being further bound to said pole by the use of a single U-bolt, installed in between said strut channels and fastened using a metal plate running across the face of said two-holed metal bracket;

said base assembly being further affixed to said pole by the use of a minimum of two shaft collars, which shall be attached immediately above said base assembly so as to prevent upward axial slippage of said base assembly along the pole;

said upper assembly being constructed by using at least three strut channels attached to said pole, said strut channels being attached to said pole using a minimum of one set of pipe clamps per strut channel of size appropriate to match the diameter of said pole, said strut channels being connected to each other at their face using a four-holed metal bracket with holes large enough to admit bolts of minimum grade 5 strength, the bottommost bolt which shall be used to affix said webbing guide in a vertical position;

said upper assembly being further bound to said pole by the use of a minimum of two U-bolts, installed in between each of said strut channels and fastened using a metal plate running across the face of said four-holed metal bracket;

said upper assembly being further affixed to said pole by the use of a minimum of one shaft collar, which shall be attached immediately below said upper assembly so as to prevent downward axial slippage of said upper assembly along the pole; and said assembly in its entirety, when attached to an occupant wearing a harness, permits the limited movement of the occupant but restricts the movement in the event of a rapid deployment of webbing, thereby restricting uncontrolled movement of the occupant within the vehicle.

2. The system as defined in claim 1 wherein the upper and lower assemblies can be raised or lowered as needed in order to meet the needs of the particular vehicle in which the assembly is to be installed.

3. A personal restraint system for use in moving vehicles for securing occupants while at the same time allowing limited movement of the occupant, comprising:

a pole affixed to the deck and ceiling of the vehicle interior;

an upper assembly, attached to the top half of the pole near the ceiling;

a middle assembly, attached at or near the midpoint of the pole;

a retractor attached to said upper assembly, with webbing deployed parallel to said pole and fed through a webbing guide or router attached to said middle assembly;

said webbing having an end fitting that permits the clipping of a carabiner or other removable attachment mechanism to permit the webbing to be attached to the rear of a harness;

said pole being affixed to the vehicle using flanges made of steel, aluminum, or other material of sufficient strength;

said upper assembly being constructed by using at least two strut channels attached to said pole, said strut channels being attached to said pole using a minimum of one set of pipe clamps per strut channel of size appropriate to match the diameter of said pole, said strut channels being connected to each other at their face using a two-holed metal bracket with holes large enough to admit bolts of minimum grade 5 strength, the bottommost bolt which shall be used to affix said retractor in a vertical downward position;

said upper assembly being further bound to said pole by the use of a single U-bolt, installed in between said strut channels and fastened using a metal plate running across the face of said two-holed metal bracket;

said upper assembly being further affixed to said pole by the use of a minimum of two shaft collars, which shall be attached immediately below said upper assembly so as to prevent downward axial slippage of said upper assembly along the pole;

said middle assembly being constructed by using at least three strut channels attached to said pole, said strut channels being attached to said pole using a minimum of one set of pipe clamps per strut channel of size appropriate to match the diameter of said pole, said strut channels being connected to each other at their face using a four-holed metal bracket with holes large enough to admit bolts of minimum grade 5 strength, the uppermost bolt which shall be used to affix said webbing guide in a vertical position;

said middle assembly being further bound to said pole by the use of a minimum of two U-bolts, installed in between each of said strut channels and fastened using a metal plate running across the face of said four-holed metal bracket;

said middle assembly being further affixed to said pole by the use of a minimum of one shaft collar, which shall be attached immediately above said upper assembly so as to prevent upward axial slippage of said middle assembly along the pole; and said assembly in its entirety, when attached to an occupant wearing a harness, permits the limited movement of the occupant but restricts the movement in the event of a rapid deployment of webbing, thereby restricting uncontrolled movement of the occupant within the vehicle.

4. The system as defined in claim 3 wherein the upper and middle assemblies can be raised or lowered as needed in order to meet the needs of the particular vehicle in which the assembly is to be installed.

* * * * *